United States Patent
Martel et al.

[11] 3,714,153
[45] Jan. 30, 1973

[54] NOVEL CYCLOPROPANECARBOXYLIC ACIDS

[75] Inventors: Jacques Martel, 93 Bondy; Jean Buendia, 94 Fontenay-Sous-Bois, both of France

[73] Assignee: Roussel-Uclaf, Paris, France

[22] Filed: June 22, 1970

[21] Appl. No.: 48,488

[52] U.S. Cl.............260/240 R, 424/275, 424/285, 260/332.3 R, 260/340.9, 260/343.6, 260/514 P
[51] Int. Cl. ............................................C09b 23/00
[58] Field of Search ..................................260/240 R

[56] References Cited

FOREIGN PATENTS OR APPLICATIONS 94,309    6/1969  France..............................260/240 R
1,505,423 6/1967  France..............................260/240 R

OTHER PUBLICATIONS

German Offen. 1,935,386, relied upon as abstracted in Chemical Abstracts, Vol. 72, abstract 100136d (1970), (pending obtention of original).
Fliszar et al., Helv. Chim. Acta Vol. 46, pages 1,580 to 1,588 (1963).

*Primary Examiner*—John D. Randolph
*Attorney*—Hammond & Littell

[57] ABSTRACT

Novel 3,3-dimethyl-2-(2'-oxo-3'-x-cyclopentylidenemethyl)-1-cyclopropanecarboxylic acids of a cis or trans structure, in the form of racemic mixtures or optically active isomers of the formula

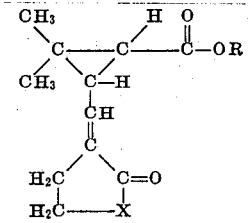

wherein X is selected from the group consisting of oxygen, sulfur and imino and R is selected from the group consisting of hydrogen, lower alkyl of one to six carbons, a radical of the formula

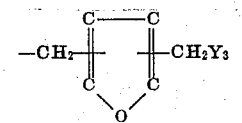

wherein $Y_3$ is aryl such as phenyl, and a radical of the formula

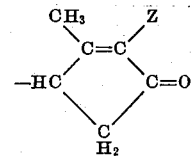

wherein Z is alkenyl or alkadienyl such as allyl, butenyl and pentadienyl and their preparation and intermediates therefor.

18 Claims, No Drawings

NOVEL CYCLOPROPANECARBOXYLIC ACIDS

OBJECTS OF THE INVENTION

It is an object of the invention to provide novel cyclopropanecarboxylic acids of formula I.

It is another object of the invention to provide a novel process for the preparation of compounds of formula I.

It is an additional object of the invention to provide novel intermediates for the compounds of formula I.

These and other objects and advantages of the invention will become obvious from the following detailed description.

THE INVENTION

The novel compounds of the invention are racemic mixtures or optically active isomers of cis or trans 3,3-dimethyl-2-[2'-oxo-3'-x-cyclopentylidenemethyl]-1-cyclopropanecarboxylic acid compounds of the formula

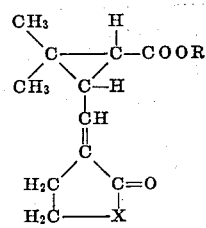

wherein X is selected from the group consisting of oxygen, sulfur and imino and R is selected from the group consisting of hydrogen, alkyl of one to six carbon atoms, a radical of the formula

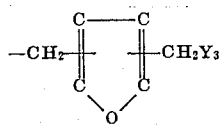

wherein $Y_3$ is aryl, and a radical of the formula

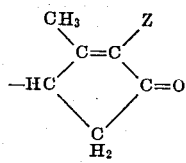

wherein Z is alkenyl of two to seven carbon atoms or alkadienyl of four to seven carbon atoms.

The compounds of formula I possess interesting insecticidal properties which make them useful in the agricultural field and in the home against harmful insects. The elevated insecticidal activity of the compounds of formula I with a cis configuration is particularly notable since in compounds of pyrethrinoid structure, the derivatives of trans configuration have the important insecticide activity. The 5-benzyl-3-furylmethyl ester of 3,3-dimethyl-2-(2'-oxo-3'-oxa-cyclopentylidenemethyl)-1-cyclopropanecarboxylic (1R, 2S) acid is endowed with a knockdown effect against domestic flies about 2 times more intense than that of dl-allethrolonyl ester of d-trans chrysanthemic acid or dl-allethrolonyl ester of d-trans pyrethric acid.

The novel process of the invention for the preparation of the cyclopropanecarboxylic acids of formula I comprises reacting 3,3-dimethyl-2-formyl-1 cyclpropanecarboxylic acid of a cis or trans structure, racemic or optically active isomer, in the presence of a strong base with a salt of a phosphonium containing a 2-oxo-3-oxa-cyclopentyl group which exists is a basic media in the form of a ylide, or in a neutral medium with a 2-oxo-3-X-cyclopentylidene triaryl phosphorane to obtain 3,3-dimethyl-2-(2'-oxo-3'-X-cyclopentylidenemethyl)-1-cyclopropanecarboxylic acid of the same configuration in the 1 and 2 positions as the starting compound. The said compound can be transformed into other derivatives by reacting the acid or a functional derivative thereof with an alcohol to form the desired ester of the same configuration in the 1-and 2-positions of the starting acids.

As the salt of the phosphonium compound containing a 2-oxo-3-X-cyclopentyltriaryl phosphonium group, one may use a salt of (2-oxo-3-X-cyclopentyl)triaryl phosphonium such as the iodide or bromide of (2-oxo-3-X-cyclopentyl) triphenyl phosphonium which in the presence of a base gives rise to a (2-oxo-3-X-cyclopentylidene) triphenyl phosphorane. Also useful are salts of (2-oxo-3-X-cyclopentyl)bis-(dialkylamino)-aryl phosphonium or of (2-oxo-3-X-cyclopentyl) (dialkylamino) diaryl phosphonium.

Among the strong bases in the presence of which the condensation of the phosphonium salt with 3,3-dimethyl-2-formyl-1-cyclopropanecarboxylic acid is effected are alkali metal hydrides such as sodium hydride, alkali metal amides such as sodium amide, alkali metal alcoholates such as sodium methanolate, sodium ethanolate or potassium tert.-butylate or alkyl lithiums such as methyl lithium.

The said condensation is conveniently effected in an organic solvent or mixture of organic solvents such as methanol, ethanol, methylene chloride, dichloroethane, chloroform, monoethyl ether of diethyleneglycol, diethyl ether of diethyleneglycol, ethyl ether, dimethylsulfoxide, tetrahydrofuran, dimethoxyethane or dimethyl formamide.

A preferred mode of the process consists of using as the phosphorus reactant containing the 2-oxo-3-X-cyclopentyl group, a 2-oxo-3-X-cyclopentylidene triaryl phosphorane and notably a 2-oxo-3-x-cyclopentylidene triphenyl phosphorane. This condensation is effected in the absence of a basic agent when using an aprotic polar solvent such as tetrahydrofuran.

2-oxo-3-X-cyclopentylidene triphenyl phosphorane can be prepared by the action of a base such as sodium carbonate, potassium carbonate or sodium hydroxide on a halide of 2-oxo-3-X-cyclopentyl triphenyl phosphonium such as described by Fliszar et al., Helv. Chim. Acta, Vol. 46 (1963) p. 1,580.

After the condensation of 3,3-dimethyl-2-formyl-1-cyclopropanecarboxylic acid with the phosphonium salt or the phosphorane, the 3,3-dimethyl-2(2'-oxo-3'-X-cyclopentylidenemethyl)-1-cyclopropanecarboxylic acid may be purified such as by eliminating the not reacted aldehyde fraction by treatment with reagent T or by transforming the acid into a salt, particularly a salt of an optically active base and purifying the diastereoisomeric salt by crystallization to obtain after acidification with an acid the pure acid.

To obtain an ester of the said acid, the acid chloride is reacted with an alcohol in the presence of a tertiary amine such as pyridine or triethylamine in an organic solvent such as benzene or toluene. The acid chloride can be formed easily by the action of oxalyl chloride with an alkali metal salt of the said acid, such as the potassium salt. The alkali metal salts of the acid can themselves be made by reacting stoichiometric quantities of the acid and an alkali metal methylate or alkali metal hydroxide.

The esterification can also be effected by using the acid anhydride or mixed acid anhydride as the functional derivative of the acid. The esters may be obtained by reacting the acid chloride with an alkali metal derivative of the desired alcohol.

The insecticidal compositions of the invention contain as the active ingredient at least one compound of formula I and may also contain one or more other pesticide agents. The compositions may be in the form of powders, granules, suspensions, emulsions, solutions, aerosol solutions, combustible tapes or other preparations classically used for compositions of this type.

In addition to the active ingredients, the compositions generally contain a vehicle and/or a non-ionic, surface-active agent to assure a uniform dispersion of the components of the mixture. The vehicle may be a liquid such as water, alcohol, hydrocarbons or other organic solvents, mineral, animal or vegetable oils, powders such as talc, clays, silicates, kieselguhr, etc.

To increase the insecticidal activity of the compositions, classical synergistic additives such as 1-(2,5,8-trioxadodecyl)-2-propyl-4,5-methylenedioxy benzene (butoxide of piperonyl), N-(2-ethylheptyl)-bicyclo(2,2,1)-5-heptene-2,3-dicarboximide, etc., may be added thereto. The compositions preferably contain 0.2 to 90 percent by weight of the active component. A preferred example of the composition is an emulsifiable concentrate of about 1 percent by weight of the 5-bencyl-3-furyl-methyl ester of 3,3-dimethyl-2-(2'-oxo-3'-oxa-cyclopentylidenemethyl)-1-cyclopropanecarboxylic (1R, 2S) acid, 10 percent of butoxide of piperonyl, 5 percent of Tween 80, 83.9 percent of xylene and 0.1 percent of Topanol A (2,4-dimethyl-6-tert.butyl-phenol).

The method of the invention for controlling insects comprises contacting insects with a lethal amount of at least one compound of formula I which may be used with other pesticidal agents.

Racemic mixtures and optically active isomers of 3,3-dimethyl-2-formyl-1-cyclopropanecarboxylic acids of the cis and trans structure may be obtained by the process described in French Pat. No. 1,580,475. Trans 3,3-dimethyl-2-formyl-1-cyclopropanecarboxylic (1S,2S) acid is obtained by treating l-trans chrysanthemic (1S,2S) acid with ozone at low temperature in methanol and then effecting reductive decomposition of the oxidation product with methyl sulfide. The corresponding (1R,2R) acid or racemic (1RS,2RS) acid can be obtained in an analogous fashion from d-trans chrysanthemic (1R, 2R) acid or racemic trans chrysanthemic (1RS, 2RS) acid.

Cis 3,3-dimethyl-2-formyl-1-cyclopropanecarboxylic (1S, 2R) acid can be prepared by reacting methanol with trans 3,3-dimethyl-2-formyl-1-cyclopropanecarboxylic (1S, 2S) acid, eliminating the water from the reaction medium with a physical agent such as anhydrous alkali metal aluminosilicate, treating the resulting dimethyl ketal of trans 3,3-dimethyl-2-formyl-1-cyclopropanecarboxylic (1S, 2S) acid with p-toluene sulfonic acid to simultaneously eliminate methanol from the reaction medium by physical means to obtain the lactone of the methyl hemiketal of cis 3,3-dimethyl-2-formyl-1-cyclopropanecarboxylic (1S, 2R) acid and hydrolyzing the said lactone by heating in a mixture of water and dioxane to obtain cis 3,3-dimethyl-2-formyl-1-cyclopropanecarboxylic (1S, 2R) acid which exists in the form of internal hemiacylal. In analogous manner, trans 3,3-dimethyl-2-formyl-1-cyclopropanecarboxylic (1R, 2R) acid and racemic trans 3,3-dimethyl-2-formyl-1-cyclopropanecarboxylic (1RS, 2RS) acid can be reacted to obtain cis 3,3-dimethyl-2-formyl-1-cyclopropanecarboxylic (1R, 2 S) acid and racemic cis 3,3-dimethyl-2-formyl-1-cyclopropanecarboxylic (1RS,2RS) acid, respectively.

Cis or trans, racemic or optically active 3,3-dimethyl-2-formyl-1-cyclopropane carboxylic acids can be prepared by a variation of the process of the said patent by treating methyl esters of chrysanthemic acids by an analogous set of reactions.

In the following examples there are described several preferred embodiments to illustrate the invention. However, it should be understood that the invention is not intended to be limited to the specific embodiments.

EXAMPLE I

Preparation of Hemiacylal of Cis 3,3-dimethyl-2-formyl-1-cyclopropanecarboxylic (1S,2R) Acid Step A: Trans 3,3-dimethyl-2-formyl-1-cyclopropanecarboxylic (1S,2S) Acid Twenty grams of l-trans chrysanthemic (1S, 2S) acid were dissolved in 250 cc of methanol and after cooling to −80° C, a current of ozonized oxygen was bubbled through the solution until a blue coloration appeared. A current of oxygen was then bubbled therethrough for 15 minutes, followed by a current of nitrogen for 45 minutes. Ten cubic centimeters of dimethyl sulfide were slowly added to the reaction mixture and the temperature was maintained at −35° C for 30 minutes, then 1 hour at 0° C and finally 1 hour at room temperature. The solvent was removed by distillation at a reduced pressure and the residue was added to a solution of 17 gm of trimethylamino acetohydrazide chloride (Reagent T) in 170 cc of ethanol and 17 cc of acetic acid. The reaction mixture was heated to reflux and held there for 1 hour, then was cooled. A dilute solution of sodium hydroxide was added to the reaction mixture which was then extracted with ether to remove any non-aldehyde fraction. The solution was made acidic with dilute aqueous hydrochloric acid and was extracted with ether. The ether solution was washed, dried and concentrated to dryness. The residue was empasted with petroleum ether (b.p. = 35° − 75° C) to obtain 5.80 gm of trans 3,3-dimethyl-2-formyl-1-cyclopropane carboxylic (1S,2S) acid.

Step B: Dimethyl ketal of trans 3,3-dimethyl-2-formyl-1-cyclopropane carboxylic (1S, 2S) Acid 13.8 gm of trans 3,3-dimethyl-2-formyl-1-cyclopropane carboxylic (1S,2S) acid were added to 100 cc of methanol under a nitrogen atmosphere and the resulting solution was refluxed for 22 hours with recycle of distillate through a column packed with siliporite (dehydrated alkali metal aluminum silicate) and was then concentrated to dryness to recover crystals impregnated with an oil impurity which was removed by vacuum filtration. The crystals were added to petroleum ether (b.p. = 67°-75° C) and vacuum filtered and dried to obtain 11.7 gm of dimethyl ketal of trans 3,3-dimethyl-2-formyl-1-cyclopropane carboxylic (1S, 2S) acid melting at 65° C.
Analysis: $C_9H_{16}O_4$; molecular weight = 188.22

Calculated: %C 57.43 %H 8.57
Found:         57.6     8.5

Step C: Lactone of Methyl hemiketal of cis 3,3-dimethyl-2-formyl-1-cyclopropane carboxylic (1S, 2R) acid Five grams of the dimethyl ketal of trans 3,3-dimethyl-2-formyl-1-cyclopropane carboxylic (1S,2S) acid and 0.21 gm of p-toluene sulfonic acid were introduced under a nitrogen atmosphere into 175 cc of benzene and the reaction mixture was heated to reflux and maintained there for distillation and the volume of the reaction mixture was kept constant by the continuous addition of benzene. After about 6 hours and cooling, the benzene was removed by distillation and the reaction mixture was added to an aqueous solution of sodium bicarbonate containing ice. The reaction mixture was then extracted with ether and concentrated to dryness to obtain 1.9 gm of the lactone of methyl hemiketal of cis 3,3-dimethyl-2-formyl-1-cyclopropanecarboxylic (1S,2R) acid having a boiling point of 60° C at 0.3 mm Hg. IR spectrum.($CHCl_3$): confirmed the absence of a free —OH and showed a band at 1,764 $cm^{-1}$ corresponding to a carbonyl of a γ-lactone.

Step D: Cis 3,3-dimethyl-2-formyl-1-cyclopropanecarboxylic (1S, 2R) acid in form of internal hemiacetal 1.9 gm of the lactone of methyl hemiketal of cis 3,3-dimethyl-2-formyl-1-cyclopropanecarboxylic (1S, 2R) acid were added to a mixture of 25 cc of water and 12.5 cc of dioxane and the mixture was maintained at 60° C for 1 hour and then concentrated to dryness at reduced pressure to obtain 0.55 gm of cis 3,3-dimethyl-2-formyl-1-cyclopropanecarboxylic (1S, 2R) acid melting at 114° C in the form of an internal hemiacylal. A sample of the product recrystallized from isopropyl ether had a melting point of 116° C and a specific rotation $[\alpha]_D^{20}$ = + 103° (C = 1% in methanol).

EXAMPLE II

Using the procedure of Step A of Example I, d-trans chrysanthemic (1R, 2R) acid and racemic trans chrysanthemic (1RS, 2RS) acid were reacted to form trans 3,3-dimethyl-2-formyl-1-cyclopropanecarboxylic (1R, 2R) acid and racemic trans 3,3-dimethyl-2-formyl-1-cyclopropanecarboxylic (1RS, 2RS) acid, respectively. Using the procedure of step B of Example I, the said compounds were reacted with methanol to form the dimethyl ketal of trans 3,3-dimethyl-2-formyl-1-cyclopropanecarboxylic (1R, 2R) acid melting at 65° C and the dimethyl ketal of racemic trans 3,3-dimethyl-2-formyl-1-cyclopropanecarboxylic (1RS, 2RS) acid, respectively.

Using the process of Step C of Example I, the said dimethyl ketals were treated to obtain the lactone of the methyl hemiketal of cis 3,3-dimethyl-2-formyl-1-cyclopropanecarboxylic (1R, 2S) acid and the lactone of the methyl hemiketal of cis 3,3-dimethyl-2-formyl-1-cyclopropane carboxylic (1RS, 2SR) acid, respectively.

Using the procedure of Step D of Example I, the said lactones were reacted to obtain the internal hemiacylal of cis 3,3-dimethyl-2-formyl-1-cyclopropanecarboxylic (1R, 2S) acid melting at 116° C and having a specific rotation $[\alpha]_D^{20}$ = −102° (c = 1% in ethanol) and the internal hemiacylal of racemic cis 3,3-dimethyl-2-formyl-1-cyclopropanecarboxylic (1RS, 2SR) acid, respectively.

EXAMPLE III

Cis 3,3-dimethyl-2-(2'-oxo-3'-oxa-cyclopentylidenemethyl)-cyclopropanecarboxylic (1R, 2S) acid A solution of 13.2 gm of (2-oxo-3-oxa-cyclopentyl) triphenylphosphonium bromide (Fliszar et al, Helv. 46 (1963) p. 1580) in 50 cc of methylene chloride was added under a nitrogen atmosphere to a solution of 2.1 gm of sodium methanolate in 20 cc of methanol and then the reaction mixture was heated to reflux and held there for 30 minutes. 2.2 gm of the internal hemiacylal of cis 3,3-dimethyl-2-formyl-1-cyclopropanecarboxylic (1R,2S) acid diluted with 30 cc of methylene chloride were added to the reaction mixture and helt at reflux for another 1 ½ hours. The reaction mixture was cooled and a saturated aqueous solution of sodium bicarbonate was added thereto. The neutral fractions were eliminated by extraction with methylene chloride and the aqueous phase was made acidic with concentrated aqueous hydrochloric acid solution. The mixture was saturated with sodium chloride and extracted with ethylether. The combined ether extracts were dried and concentrated to dryness under reduced pressure. The residue was added to 1.9 gm of Reagent T, 1.9 cc of ethanol and 1.9 cc of acetic acid and the reaction mixture was heated to reflux and held there for 1 hour. The reaction mixture was poured into a mixture of water, ice and 3 cc of 10 N aqueous sodium hydroxide and the non-aldehydic fraction was extracted with ethyl ether. The ether extracts were dried and concentrated to dryness under reduced pressure. The residue was crystallized from a mixture of isopropylether-methanol (3:1) to obtain 0.40 gm of cis 3,3-dimethyl-2-(2'-oxo-3'-oxa-cyclopentylidenemethyl)-1-cyclopropanecarboxylic (1R, 2S) acid melting at 177° C and having a specific rotation $[\alpha]_D^{20}$ = + 22° (C = 0.59% in ethanol). A second crop of 0.18 gm of product melting at 176° C was obtained from the mother liquors. The first crop was analyzed:
Analysis: $C_{11}H_{14}O_4$; molecular weight = 210.23

Calculated: %C62.84 %H 6.71
Found:        62.7     6.6

U. V. Spectrum (ethanol)
λ max. at 245–246 mμ ε = 15,700

In an analogous manner, the corresponding (1S, 2R) acid and the racemic (1SR, 2RS) acid were reacted to obtain, respectively, cis 3,3-dimethyl-2-(2'-oxo-3'-oxa-cyclopentylidenemethyl)1cyclopropanecarboxylic (1S, 2R) acid melting at 177° C and having a specific rotation $[\alpha]_D^{20}$ = −21° (C = 0.59% in ethanol) and racemic cis 3,3-dimethyl-2-(2'-oxo-3'-oxa-cyclopentylidenemethyl)-1-cyclopropanecarboxylic (1SR,2RS) acid.

As far as is known, these three compounds are not described in the literature.

EXAMPLE IV

Cis 3,3-dimethyl-2-(2'-oxo-3'-oxa-cyclopentylidenemethyl)-1-cyclopropanecarboxylic (1R, 2S) acid 5.5 gm of 2'-oxo-3'-oxa-cyclopentylidenetriphenylphosphorane [Fliszar et al, Helv. Chim. Acta, Vol. 46 (1963), p. 1,580] were added under a nitrogen atmosphere to 250 cc of tetrahydrofuran and the reaction mixture was heated to reflux. After the addition of 2.26 of the internal hemiacylal of cis 3,3-dimethyl-2-formyl-1-cyclopropanecarboxylic (1R, 2S) acid, diluted with 10 cc of tetrahydrofuran the reflux was maintained for 6 hours. The tetrahydrofuran was distilled off under reduced pressure and methylene chloride was added to the residue. The acid form was extracted with a saturated aqueous solution of sodium bicarbonate and the combined aqueous phases were washed with methylene chloride and was acidified with aqueous concentrated hydrochloric acid. The acid aqueous phase was extracted with methylene chloride and the combined methylene chloride extracts were dried and concentrated to dryness by distillation under reduced pressure to obtain 3.1 gm of cis 3,3-dimethyl-2-(2'-oxo-3'-oxa-cyclopentylidenemethyl)-1-cyclopropane carboxylic (1R, 2S) acid melting at 177° C and having a specific rotation $[\alpha]_D^{20} = +22°$ (C = 0.59% in ethanol). It was identical to the compound obtained in Example III.

EXAMPLE V 5-benzyl-3-furylmethyl ester of cis 3,3-dimethyl-2-(2'-oxo-3'-oxa-cyclopentylidenemethyl)-1-cyclopropanecarboxylic (1R, 2S) Acid Step A 0.520 gm of cis 3,3-dimethyl-2-(2'-oxo-3'-oxa-cyclopentylidenemethyl)-1-cyclopropanecarboxylic (1R, 2S) acid was added under a nitrogen atmosphere to 2 cc of methanol and then an amount of a methanolic solution of 5 percent potassium hydroxide was added dropwise in the presence of phenolphthalein until the pink color of phenolphthalein occurred. The methanol was removed by distillation under reduced pressure, then with the addition of benzene and distillation under reduced pressure to obtain the potassium salt of cis 3,3-dimethyl-2-(2'-oxo-3'-oxa-cyclopentylidenemethyl)-1-cyclopropanecarboxylic (1R, 2S) acid.

As far as is known, this compound is not described in the literature.

Step B

The potassium salt obtained in Step A was added to 10 cc of benzene and after the addition of 0.5 cc of pyridine thereto under a nitrogen atmosphere, then a solution of 0.630 gm of oxalyl chloride in 5 cc of benzene was added dropwise. The insolubles were removed by filtration and after stirring the solution for one hour at room temperature, the solvent was distilled off under reduced pressure then with the addition of benzene and distillation under reduced pressure to obtain cis 3,3-dimethyl-2-(2'-oxo-3-oxa-cyclopentylidenemethyl)-1-cyclopropanecarboxylic (1R, 2S) acid chloride.

As far as is known, this compound is not described in the literature.

Step C

A solution of 0.515 gm of 5-benzyl-3-furyl-methanol in 5 cc of benzene and 0.5 cc of pyridine were added dropwise at + 5° C to a suspension of the acid chloride Step B in 10 cc of benzene and the mixture was stirred for 15 hours at room temperature. The reaction mixture was poured into a mixture of 50 cc of aqueous 2N hydrochloric acid solution and ice and the benzene phase was recovered by decantation and was washed successively with water, a saturated aqueous sodium bicarbonate solution and then water. The aqueous phase was extracted with ethyl ether and the combined organic phases were dried, and concentrated to dryness under reduced pressure. The residue was purified by chromatography and silica gel column impregnated with a mixture of benzene-ethyl acetate-triethylamine (68-30-) with elution with a mixture of benzene-ethyl acetate (70-30) containing 0.2 percent of triethylamine to obtain 0.690 gm of 5-benzyl-3-furyl-methyl ester of cis 3,3-dimethyl-2-(2'-oxo-3'-oxa-cyclopentylidenemethyl)-1-cyclopropanecarboxylic (1R, 2S) acid having a specific rotation $[\alpha]_D^{20} = 0° \pm 1°$ (C = 0.48% in ethanol).

Analysis: $C_{23}H_{24}O_5$; molecular weight = 380.42

| | | |
|---|---|---|
| Calculated: | %C72.61 | %H 6.36 |
| Found: | 72.7 | 6.3 |

U. V. Spectrum (ethanol)

λ max. at 224 mμ $E_{1\ cm1\%} = 476$

Inflex. towards 241 mμ $E_{1\ cm}^{1\%} = 422$

As far as is known, this compound is not described in the literature.

EXAMPLE VI dl-allethrolone ester of cis 3,3-dimethyl-2-(2'-oxo-3'-oxa-cyclopentylidenemethyl)-1-cyclopropanecarboxylic (1R, 2S) acid Step A 2.8 gm of cis 3,3-dimethyl-2-(2'-oxo-3'-oxa-cyclopentylidenemethyl)-1-cyclopropanecarboxylic (1R, 2S) acid was reacted as in Step A of Example V to obtain the potassium salt of cis 3,3-dimethyl-2-(2'-oxo-3'-oxa-cyclopentylidenemethyl)-1-cyclopropanecarboxylic (1R, 2S) acid. The said potassium salt was treated as in Step B of Example V to obtain the corresponding acid chloride.

Step B

The said acid chloride was suspended in 54 cc of benzene and then 3 cc of pyridine followed by 2.486 gm of dl-allethrolone (titrating 90%) diluted with 10 cc of benzene were added to the suspension at 5° C under a nitrogen atmosphere. The reaction mixture was stirred for 60 hours at room temperature and was then poured into a mixture of ice and an aqueous solution of hydrochloric acid. The organic phase was separated by decantation and was then washed successively with water, a saturated aqueous sodium bicarbonate solution and then water. The aqueous phases were extracted with ether and the organic phases were combined, dried and concentrated to dryness by distillation under reduced pressure. The residue was purified by chromatography over silica gel with elution with a mixture of benzene-ethyl acetate (1–1) made alkaline with 0.5 percent of triethylamine to obtain 1.69 gm of dl-allethrolone ester of cis 3,3-dimethyl-2-(2'-oxo-3'-oxa-cyclopentylidenemethyl)-1-cyclopropane carboxylic (1R,2S) acid having a specific rotation $[\alpha]_D^{20} = -6.5°$ (C = 1.1 % in ethanol).

Analysis: $C_{20}H_{24}O_5$; molecular weight = 344.40

| Calculated: | %C 69.75 | %H 7.02 |
|---|---|---|
| Found: | 69.9 | 7.3 |

U. V. Spectrum (ethanol)
λ max at 235 mμ ∈ = 24,900

As far as is known, this compound is not described in the literature.

EXAMPLE VII

Trans 3,3-dimethyl-2-(2'-oxo-3'-oxa-cyclopentylidenemethyl)-1-cyclopropanecarboxylic (1R, 2R) Acid In a manner analogous to Example III, 5.68 gm of trans 3,3-dimethyl-2-formyl-1-cyclopropanecarboxylic (1R, 2R) acid was reacted to obtain 3.08 gm of trans 3,3-dimethyl-2-(2'-oxo-3'-oxa-cyclopentylidenemethyl) -1-cyclopropanecarboxylic (1R, 2R) acid melting at 137° C and having a specific rotation $[\alpha]_D^{20} = +57.5°$ (C = 0.69% in ethanol).

Analysis: $C_{11}H_{14}O_4$; molecular weight = 210.23

| Calculated: | %C 62.84 | %H 6.71 |
|---|---|---|
| Found: | 62.6 | 6.7 S, |

In a similar fashion, trans 3,3-dimethyl-2-formyl-1-cyclopropanecarboxylic (1S, 2S) acid and the corresponding racemic mixture were reacted to form trans 3,3-dimethyl-2(2'-oxo-3-oxa'-cyclopentylidenemethyl)-1-cyclopropanecarboxylic (1S,2S) acid as well as the corresponding racemate thereof.

As far as is known, the said three compounds have not been described in the literature.

EXAMPLE VIII

Trans 3,3-dimethyl-2-(2'-oxo-3'-oxa-cyclopentylidenemethyl)-1-cyclopropanecarboxylic (1R, 2R) Acid Using the procedure of Example IV, 2.26 gm of trans 3,3-dimethyl-1formyl-1-cyclopropanecarboxylic (1R, 2R) acid were reacted to obtain 2.885 gm of trans 3,3-dimethyl-2-(2'-oxo-3'-oxa-cyclopentylidenemethyl)-1-cyclopropane-carboxylic (1R, 2R) acid melting at 135° C and having a specific rotation $[\alpha]_D^{20} = +57.5°$ (C = 0.69% in ethanol.) The product was identical to that of Example VII.

EXAMPLE IX

Using the procedure of Example V, 2.5 gm of trans 3,3-dimethyl-2-(2'-oxo-3'-oxa-cyclopenty-lidenemethyl)-1-cyclopropanecarboxylic (1R, 2R) acid were reacted to obtain 2.95 gm of the 5-benzyl-3-furyl-methyl ester of trans 3,3-dimethyl-2-(2'-oxo-3'-oxa-cyclopentylidenemethyl)-1-cyclopropane carboxylic (1R,2R) acid, in oily form having a refractive index $n_D^{21}=1.5630$ and a specific rotation $[\alpha]_D^{20} = +7°$ (C = 1.2 % in ethanol).

Analysis: $C_{23}H_{24}O_5$; molecular weight = 380.42

| Calculated: | %C 72.61 | %H 6.36 |
|---|---|---|
| Found: | 72.8 | 6.5 |

U. V. Spectrum (ethanol)

λ max. at 224–225 mμ  $E_{1\ cm}^{1\%} = 488$
λ max. at 241 mμ  $E_{1\ cm}^{1\%} = 452$ As far as is known, this compound is not described in the literature.

EXAMPLE X

Using the procedure of Example VI, 2.8 gm of trans 3,3-dimethyl-2-(2'-oxo-3'-oxa-cyclopenty-lidenemethyl)-1-cyclopropanecarboxylic (1R, 2R) acid was reacted to obtain 3.01 gm of the d,1-allethrolone ester of trans 3,3-dimethyl-2-(2'-oxo-3'-oxa-cyclopentylidenemthyl)-1-cyclopropanecarboxylic (1R, 2R) acid having a specific rotation $[\alpha]_D^{20} = +8.5°$ (C = 0.9% in ethanol).

U.V. Spectrum (ethanol) λ max. at 235 μ ∈ = 25.650

As far as is known, this compound is not described in the literature.

EXAMPLE XI

Cis 3,3-dimethyl-2-(2'-oxo-3'-thia-cyclopentylidenemethyl)-1-cyclopropanecarboxylic (1R, 2S) Acid 4.6 gm of 2-oxo-3-thia-cyclopentylidene triphenylphosphorane [described by Zimmer et al. Tetrah. Lett. No. 52, (1968) p. 5435] and 1.8 gm of the internal hemiacylal of cis 3,3-dimethyl-2-formyl-1-cyclopropanecarboxylic (1R, 2S) acid were added to 120 cc of tetrahydrofuran and the reaction mixture was heated to reflux and held there for 4 hours. The tetrahydrofuran was distilled off under reduced pressure and methylene chloride was added thereto. The organic phase was extracted with an aqueous solution of sodium bicarbonate and the aqueous alkaline phase was acidified to a pH of 2 and was then extracted with methylene chloride. The methylene chloride extracts were dried and concentrated to dryness by distillation under reduced pressure. The residue was empasted with isopropyl ether to obtain 2.140 gm of cis 3,3-dimethyl-2-(2-oxo'-3'-thiacyclopentylidenemethyl)-1-cyclopropanecarboxylic (1R, 2S) acid melting at 161° C.

RMN Spectrum (deuterochloroform)

The RMN Spectrum is in accord with the cis configuration of the ring. It decomposed as follows:

Signals at 72–82 Hz corresponding to hydrogens of 3-methyls.
Signals at 109 to 124 Hz corresponding to hydrogens in the 1 and 2 positions of the cyclopropane ring.
Signals at 173–209 Hz corresponding to hydrogens in the 4' and 5' positions of 2'-oxo-3'-thia-cyclopentyl ring.
Signals at 401 to 413 Hz corresponding to ethylenic hydrogen.

Signal at 550 Hz corresponding to carboxyl hydrogen.

As far as is known, this compound is not described in the literature.

EXAMPLE XII 5-benzyl-3-furyl-methyl Ester of Cis 3,3-dimethyl-2-(2'-oxo-3'-thia-cyclopentylidenemethyl)-1-cyclopropanecarboxylic (1R, 2S) Acid Step A 1.850 gm of cis 3,3-dimethyl-2-(2'-oxo-3'-thia-cyclopentylidenemethyl)-1-cyclopropane carboxylic (1R, 2S) acid was added to 16 cc of methylene chloride and after the addition of 2 cc of thionyl chloride thereto, the mixture was stirred at room temperature for 1 ½ hours. The volatile fraction was removed by distillation under reduced pressure to obtain the cis 3,3-dimethyl-2-(2'-oxo-3'-thiacyclopentylidenemethyl)-1-cyclopropanecarboxylic (1R, 2S) acid chloride which was used as is for the next step.

As far as is known, this compound is not described in the literature.

Step B

The acid chloride from Step A was added to a mixture of 10 cc of benzene and 3 cc of pyridine and then a solution of 1.54 gm of 5-benzyl-3-furyl-methanol in 7 cc of benzene was added thereto. The reaction mixture was stirred for 15 hours at room temperature and the precipitate formed was filtered off. The filtrate was washed successively with an aqueous 2N hydrochloric acid solution, water, an aqueous solution of sodium bicarbonate and then water; was dried and concentrated to dryness under reduced pressure. The residue was purified by chromatography over silica gel with elution with a mixture of benzene-ethyl-acetate (80–20) to obtain 2.650 gm of the 5-benzyl-3-furyl-methyl ester of cis 3,3-dimethyl-2-(2'-oxo-3'-thia-cyclopentylidenemethyl)-1-cyclopropanecarboxylic (1R, 2S) acid having a specific rotation $[\alpha]_D^{20} = +10.5$ (C = 1.0% in ethanol).

RMN Spectrum (deuterochloroform)

RMN spectrum is in accord with a cis configuration of the ring. It decomposed as follows:

Signals at 74–79 Hz corresponding to hydrogens of 3-methyls.

Signals at 95–103.5–112.5–122 Hz corresponding to hydrogens at cyclopropyl.

Signals at 168–212 Hz corresponding to cyclopentane hydrogens.

Signal at 235 Hz corresponding to hydrogens of $CH_2$ of the benzyl group.

Signal at 293.8 Hz corresponding to hydrogens of $CO_2$—$CH_2$ group.

Signal at 362.1 Hz corresponding to 4-hydrogen in furan ring.

Signals at 405.5–415.5 Hz corresponding to ethylenic hydrogen.

Signal at 435 Hz corresponding to hydrogens of benzene nucleus.

Signal at 449.5 Hz corresponding to 2-hydrogen of furan ring.

As far as is known, this compound is not described in the literature.

EXAMPLE XIII

Preparation of Trans 3,3-dimethyl-2-(2-oxo'-3-thia-cyclopentylidenemethyl)-1-cyclopropanecarboxylic (1R, 2R) Acid 3.62 gm of 2-oxo-3-thia-cyclopentylidene triphenyl phosphorane [described by Zimmer et al., Tetrah. Lett. No. 52 (1968), p. 5435] and 1.42 gm of trans 3,3-dimethyl-2-formyl-1-cyclopropane carboxylic (1R, 2R) acid were added to 100 cc of tetrahydrofuran and the reaction mixture was heated to reflux and held there for 4 hours. The tetrahydrofuran was distilled off under reduced pressure and the residue was extracted with methylene chloride. The combined methylene chloride phases were washed with an aqueous sodium bicarbonate solution and the combined alkaline aqueous phases were acidified to a pH of 2. The aqueous acid phase was extracted with methylene chloride and the organic extract was dried and concentrated to dryness under reduced pressure. The residue was empasted with isopropyl ether to obtain 1.170 gm of trans 3,3-dimethyl-2-(2'-oxo-3'-thia-cyclopentylidenemethyl)-1-cyclopropanecarboxylic (1R,2R) acid melting at 117° C and having a specific rotation $[\alpha]_D^{20} = +52.5°$ (C = 1% in ethanol).

RMN Spectrum (deuterochloroform)

The RMN spectrum was in accordance with the trans configuration of the ring. It decomposed as follows:

Signals at 78–82.5Hz corresponding to hydrogens of 3-methyl.

Signals at 106–111.5–118.5 Hz corresponding to hydrogen at 2-position.

Signals at 124–128.5–134 Hz corresponding to hydrogen at 1-position.

Signals at 183.5–186–191 Hz corresponding to hydrogens at 5'-position of the 2'-oxo-3'-thia-cyclopentyl ring.

Signals at 197–202 Hz corresponding to hydrogens at 4'-position of the 2'-oxo-3'-thia-cyclopentyl ring.

Signals at 369–379 Hz corresponding to ethylenic hydrogen.

Signal at 601 Hz corresponding to carboxyl hydrogen.

As far as is known, this compound is not described in the literature.

EXAMPLE XIV

5-Benzyl-3-furyl-methyl Ester of Trans 3,3-Dimethyl-2-(2'-oxo-3'-thia-cyclopentylidenemethyl)-1-cyclopropane Carboxylic (1R,2R) Acid Step A 1.530 gm of the acid of Example XIII were added to 12 cc of methylene chloride and after the addition of 2 cc of thionylchloride, the reaction mixture was stirred at room temperature for 1 ½ hours. The volatile fraction was distilled off under reduced pressure to obtain trans 3,3-dimethyl-2-(2'-oxo-3'-thia-cyclopentylidenemethyl)-1-cyclopropanecarboxylic (1R, 2R) acid chloride which was used as is for the next step.

As far as is known, this compound is not described in the literature.

Step B

The acid chloride from Step A was added to 10 cc of benzene and 3 cc of pyridine and a solution of 1.28 gm of 5-benzyl-3-furyl-methanol in 5 cc of benzene was added thereto. The reaction mixture was stirred for 15 hours at room temperature and was filtered to remove the precipitate formed. The filtrate was successively washed with a solution of 2N aqueous hydrochloric acid, water, aqueous solution of sodium bicarbonate and then water. The solution was dried and the solvent was distilled off under reduced pressure. The residue was purified by chromatography over silica gel with elution with a mixture of benzene-ethyl acetate (70–30). The product was empasted with isopropyl ether to obtain 1.446 gm of the 5-benzyl-3-furyl-methyl ester of trans 3,3-dimethyl-2-(2'-oxo-3'-thia-cyclopentylidene methyl)-1-cyclopropanecarboxylic (1R, 2R) acid melting at 133° C and having a specific rotation $[\alpha]_D^{20} = -9.5°$ (C = 0.5% in ethanol).

RMN spectrum (deuterochloroform)

The RMN spectrum is in accordance with the trans configuration of the ring. It decomposed as follows:

Signals at 75–78 Hz corresponding to hydrogens of 3-methyl.

Signals at 105.5–110.5–116 Hz corresponding to hydrogen in 2-position.

Signals at 122.5–127.5–131 Hz corresponding to hydrogen in 1-position.

Signals at 170 and 210 Hz corresponding to hydrogen in 5-and 4'-position of 2'-oxo-3'-thia cyclopentyl ring.

Signal at 237.5 Hz corresponding to hydrogens of $CH_2$ of benzyl group.

Signal at 297.5 Hz corresponding to hydrogens of $CH_2$ of $-CO_2-CH_2-$ group.

Signal at 364 Hz corresponding to hydrogen in 4-position of furan ring.

Signals at 360–378 Hz corresponding to ethylenic hydrogen.

Signal at 438 Hz corresponding to hydrogens of benzene ring.

Signal at 443.5 Hz corresponding to 2-hydrogen of furan ring.

As far as is known, this compound is not described in the literature.

EXAMPLE XV

Cis 3,3-dimethyl-2-(2'-oxo-3'-imino-cyclopentylidene-methyl)-1-cyclopropanecarboxylic (1R, 2S) Acid Step A 3.5 gm of 3-bromo-pyrrolidone-2, [described by Wineman et al, J.A.C.S., vol. 80 (1958), p. 6233] and 5.6 gm of triphenyl phosphine were added to 40 cc of tetrahydrofuran and the reaction mixture was heated to reflux and held there for 96 hours. The precipitate formed was recovered by vacuum filtration, was washed and dried to obtain 5.950 gm of pyrrolidone-2-yl-3 triphenyl phosphonium bromide. The filtrate was again heated for 14 hours and the precipitate formed was recovered by vacuum filtration, was washed and dried to obtain a second crop of 0.450 gm of the said product.

RMN Spectrum (deuterochloroform)

The decomposition spectrum had the following values:

Signals at 110 to 240 Hz corresponding to hydrogens of the $CH_2$ group of the ring.

Signal at 380 Hz corresponding to hydrogen of —N—H—.

Signal at 460 Hz corresponding to hydrogens of benzene rings.

As far as is known, this compound is not described in the literature.

Step B 0.213 gm of the internal hemiacylal of cis 3,3-dimethyl-2-formyl-1-cyclopropanecarboxylic (1R, 2S) acid was added to 10 cc of dimethylformamide and then progressively were added thereto 0.180 gm of potassium tert.-butylate, 0.640 gm of pyrrolidone-2-yl-3 triphenyl phosphonium bromide and then a solution of 0.420 gm of potassium tert.-butylate in 5 cc of dimethylformamide. The reaction mixture was allowed to stand for 4 hours at room temperature and was then heated at 80° C for 1 hour and cooled. A few drops of water were added to the reaction mixture to destroy any excess potassium tert.-butylate and the mixture was then poured into a water-ice mixture. The aqueous phase was extracted with methylene-chloride and the aqueous phase was acidified to a pH of 1 with a 2N aqueous hydrochloric acid and was then extracted with methylene chloride. The organic extracts were dried and the solvent was distilled off under reduced pressure. The residue was added to methylene chloride and the crystals formed (crystals A) were recovered by vacuum filtration. The filtrate was concentrated again by distillation under reduced pressure to eliminate remaining traces of dimethyl formamide and 1 cc of methylene chloride was added and the mixture was cooled. The crystals formed (crystals B) were recovered by vacuum filtration. Combined crystals A and B were washed with methanol to obtain 80 mg of cis 3,3-dimethyl-2-(2'-oxo-3'-imino-cyclopentylidenemethyl)-1-cyclopropane-carboxylic (1R,2S) acid melting at 240° C.

IR Spectrum (Nujol)

Absorption at 1,698 cm$^{-1}$ (c=o)
Absorption at 1,634 cm$^{-1}$ (c=c)
Absorption at 3,239 cm$^{-1}$
(General absorption area of OH and associated NH)

RMN Spectrum (dimethylsulfoxide

It decomposed as follows:

Signal at 73–75 Hz corresponding to hydrogens of 3-methyl

Signal at 111–114 Hz corresponding to hydrogen at 1-position

Signal at 383 Hz corresponding to ethylenic hydrogen

Signal at 467 Hz corresponding to proton exchangeable between NH AND COOH

It should be noted that the spectrum bands were greatly displaced due to the dimethylsulfoxide solvent. However, in the spectrum of the corresponding ester of 5-benzyl-3-furylmethyl made in deuterochloroform the usual frequencies were met.

As far as is known, this compound is not described in the literature.

EXAMPLE XVI

Cis 3,3-dimethyl-2-(-2'-oxo-3'-imino-cyclopentylidenemethyl)-1-cyclopropane carboxylic (1R, 2S) Acid Step A 1.278 gm of pyrrolidone-2-yl-3 triphenyl phosphonium bromide were added to 5 cc of water, then 1 cc of a 6N sodium hydroxide solution was added thereto all at once and the mixture was energetically stirred for 2 minutes. The precipitate formed was recovered by vacuum filtration, was washed with ether and dried to obtain 0.980 gm of raw pyrrolidone-2-yl-3 triphenyl phosphorane melting at 134° C. The most notable impurity in the product was the starting bromide.

As far as is known, this compound is not described in the literature.

Step B 0.403 gm of the internal hemiacylal of cis 3,3-dimethyl-2-formyl-1-cyclopropanecarboxylic (1R, 2S) acid and 0.480 gm of raw pyrrolidone-2-yl-3-tripehnyl phosphorane were added to 25 cc of tetrahydrofuran and the reaction mixture was heated to reflux and held there for 24 hours. Two-thirds of the solvent was distilled off under reduced pressure and the solution was cooled and added to a saturated aqueous sodium bicarbonate solution. After addition of ether, the mixture was stirred and the ether phase was decanted 132 off. The aqueous phase was acidified to a pH of 1 and was extracted with methylene chloride. The organic phase was dried and distilled to dryness under reduced pressure. 2 cc of methylene chloride were added to the residue, cooled and the crystals formed were recovered by vacuum filtration, were washed and dried to obtain 167 mg of cis 3,3-dimethyl-2-(2'-oxo-3'-imino-cyclopentylidenemethyl)-1-cyclopropenecarboxylic (1R, 2S) acid melting at 240° C. The physical characteristics were identical to those of the product of Example XV.

EXAMPLE XVII

5-Benzyl-3-furyl-methyl Ester of Cis 3,3-Dimethyl-2-(2'-oxo-3-imino-cyclopentylidenemethyl)-1-cyclopropane Carboxylic (1R, 2S) Acid.

Step A

One gram of cis 3,3-dimethyl-2-(2'-oxo-3'-imino-cyclopentylidenemethyl)-1-cyclopropane carboxylic (1R, 2S) acid was added to 20 cc of methylene chloride and 2 cc of thionyl chloride were added thereto. After stirring for 1 ½ hours at room temperature, the volatile fraction was distilled off under reduced pressure to form raw cis 3,3-dimethyl-2-(2'-oxo-3'-imino-cyclopentylidenemethyl)-1-cyclopropanecarboxylic (1R, 2S) acid chloride which was used as is for the next step.

As far as is known, this compound is not described in the literature.

Step B

The acid chloride from Step A was added to 25 cc of benzene and 2 cc of pyridine and a solution of 0.830 gm of 5-benzyl-3-furyl-methanol in 7 cc of benzene was added thereto. The mixture was stirred for 20 hours at room temperature and the precipitate formed was removed by vacuum filtration. The filtrate was successively washed with an aqueous 2N hydrochloric acid solution, water, aqueous sodium bicarbonate solution and water, then dried and concentrated to dryness. The residue was purified by chromatography over silica gel with elution with a mixture of benzene-ethylacetate (20–80) to obtain 0.835 gm of the 5-benzyl-3-furyl-methyl ester of cis 3,3-dimethyl-2-(2'-oxo-3'-imino-cyclopentylidene methyl)-1-cyclopropane carboxylic (1R, 2S) acid having a specific rotation $[\alpha]_D^{20} = +13.5°$ (C = 0.9% in ethanol).

RMN spectrum (deuterochloroform)

It is in accordance with the cis configuration of the ring. It decomposed as follows:

Signals at 73–79 Hz corresponding to hydrogens of 3-methyl.

Signals at 95–121 Hz corresponding to hydrogens in 1' and 2' position of the cyclopentyl ring.

Signals at 157–164–170 Hz corresponding to hydrogens in 5'-position of cyclopentyl ring.

Signals at 198–204.5–211.5 Hz corresponding to hydrogens in 4'-position of cyclopentyl ring.

Signal at 234.5 Hz corresponding to $CH_2$ of benzyl group.

Signal at 293.5 Hz corresponding to hydrogens of — COO—$CH_2$.

Signal at 363 Hz corresponding to hydrogen at 4-position of furane ring.

Signals at 402–411 Hz corresponding to ethylenic hydrogen.

Signal at 435.5 Hz corresponding to hydrogens of benzene ring.

Signal at 441 Hz corresponding to hydrogen in 2-position of furan ring.

Signal at 459 Hz corresponding to hydrogen of —NH—.

As far as is known, this compound is not described in the literature.

Various modifications of the compositions and process of the invention may be made without departing from the spirit or scope thereof and it is to be understood that the invention is to be limited only as defined in the appended claims.

We claim:

1. A compound selected from the group consisting of optically active and racemic mixtures of a compound of the formula

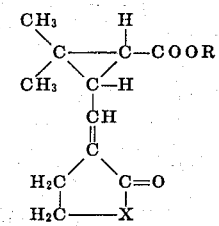

wherein X is selected from the group consisting of oxygen and sulfur and R is selected from the group consisting of hydrogen, alkali metal, alkyl of one to six carbon atoms, a radical of the formula

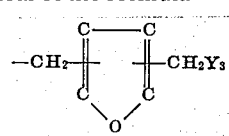

wherein $Y_3$ is phenyl and a radical of the formula

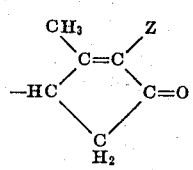

wherein Z is selected from the group consisting of alkenyl of two to seven carbon atoms and alkadienyl of four to seven carbon atoms.

2. A compound of claim 1 wherein X is oxygen.

3. A compound of claim 1 selected from the group consisting of trans 3,3-dimethyl-2-(2'-oxo-3'-oxa-cyclopentylidenemethyl)-1-cyclopropanecarboxylic (1R, 2R) or (1S, 2S) acid and a racemic mixture of said acids.

4. A compound of claim 1 selected from the group consisting of cis 3,3-dimethyl-2-(2'-oxo-3'-oxa-cyclopentylidenemethyl)-1-cyclopropanecarboxylic (1R, 2S) or (1S, 2R) acid and a racemic mixture of said acids.

5. A compound of claim 1 selected from the group consisting of cis-3,3-dimethyl-2-(2'-oxo-3'-thia-cyclopentylidenemethyl)-1-cyclopropanecarboxylic (1R,2S) or (1S,2R) acid and a racemic mixture of said acids.

6. A compound of claim 1 selected from the group consisting of trans 3,3-dimethyl-2-(2'-oxo-3'-thia-cyclopentylidenemethyl)-1-cyclopropanecarboxylic (1R, 2R) or (1S, 2S) acid and a racemic mixture of said acids.

7. A compound of claim 1 which is the 5-benzyl-3-furyl-methyl ester of trans 3,3-dimethyl-2-(2'-oxo-3'-oxa-cyclopentylidenemethyl)-1-cyclopropanecarboxylic (1R, 2R) acid.

8. A compound of claim 1 which is the 5-benzyl-3-furyl-methyl ester of cis 3,3-dimethyl-2-(2'-oxo-3'-oxa-cyclopentylidenemethyl)-1-cyclopropanecarboxylic (1R,2S) acid.

9. A compound of claim 1 which is the dl al-lethrolone ester of trans 3,3-dimethyl-2-(2'-oxo-3'-oxa-cyclopentylidenemethyl)-1-cyclopropanecarboxylic (1R, 2R) acid.

10. A compound of claim 1 which is dl-allethrolone ester of cis 3,3-dimethyl-2-(2'-oxo-3'-oxa-cyclopentylidenemethyl)-1-cyclopropanecarboxylic (1R, 2S) acid.

11. A compound of claim 1 which is the 5-benzyl-3-furyl-methyl ester of cis 3,3-dimethyl-2-(2'-oxo-3'-thiacyclopentylidene-methyl)-1-cyclopropanecarboxylic (1R, 2S) acid.

12. A compound of claim 1 which is the 5-benzyl-3-furyl-methyl-ester of trans 3,3-dimethyl-2-(2'-oxo-3'-thia-cyclopentylidenemethyl)-1-cyclopropanecarboxylic (1R, 2R) acid.

13. A compound of claim 1 which is the potassium salt of cis 3,3-dimethyl-2-(2'-oxo-3'-oxa-cyclopentylidenemethyl-1-cyclopropanecarboxylic (1R, 2S) or (1S, 2R) acid and racemic mixtures thereof.

14. A compound of claim 1 which is potassium salt of trans 3,3-dimethyl-2-(2'-oxo-3'-oxa-cyclopentylidenemethyl)-1-cyclopropanecarboxylic (1R, 2R) or (1S, 2S) acid and racemic mixtures thereof.

15. Cis 3,3-dimethyl-2-(2'-oxo-3'-oxa-cyclopentylidenemethyl)-1-cyclopropanecarboxylic (1R, 2S) or (1S, 2R) acid chloride and racemic mixtures thereof.

16. Trans 3,3-dimethyl-2-(2'-oxo-3'-oxa-cyclopentylidenemethyl)-1-cyclopropanecarboxylic (1R, 2R) or (1S, 2S) acid chloride and racemic mixtures thereof.

17. Cis 3,3-dimethyl-2-(2'-oxo-3'-thia-cyclopentylidenemethyl)-1-cyclopropanecarboxylic (1R, 2S) or (1S, 2R) acid chloride and racemic mixtures thereof.

18. Trans 3,3-dimethyl-2-(2'-oxo-3'-thia-cyclopentylidenemethyl)-1-cyclopropanecarboxylic (1R, 2R) or (1S, 2S) acid chloride and racemic mixtures thereof.

* * * * *